(12) United States Patent
Meguro et al.

(10) Patent No.: US 7,211,955 B2
(45) Date of Patent: May 1, 2007

(54) LAMP

(75) Inventors: Takeshi Meguro, Ibaraki (JP); Tsutomu Koino, Takatsuki (JP); Naoki Kohyama, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 211 days.

(21) Appl. No.: 10/536,701

(22) PCT Filed: Sep. 9, 2004

(86) PCT No.: PCT/JP2004/013474

§ 371 (c)(1),
(2), (4) Date: May 27, 2005

(87) PCT Pub. No.: WO2005/038847

PCT Pub. Date: Apr. 28, 2005

(65) Prior Publication Data

US 2006/0061281 A1    Mar. 23, 2006

(30) Foreign Application Priority Data

Oct. 15, 2003    (JP)    ............................ 2003-354861

(51) Int. Cl.
*H01J 17/02*    (2006.01)

(52) U.S. Cl. ...................................................... 313/626
(58) Field of Classification Search ................. 313/43, 313/623, 624, 625, 626
See application file for complete search history.

(56) References Cited

U.S. PATENT DOCUMENTS 4,758,407 A     7/1988   Ballentine et al.

FOREIGN PATENT DOCUMENTS

| JP | 51-85286 | 7/1976 |
| JP | 54-129770 | 10/1979 |
| JP | 2-34295 | 2/1990 |
| JP | 3-255637 | 11/1991 |
| JP | 11-151591 | 6/1999 |
| JP | 2002-1575 | 1/2002 |
| JP | 2002-239781 | 8/2002 |
| JP | 2002-245974 | 8/2002 |
| JP | 2002-321084 | 11/2002 |

*Primary Examiner*—Vip Patel

(57) ABSTRACT

A lamp includes a glass bulb 2 with a concave portion 1, a base 7 attached so as to cover at least part of the concave portion, a lead 11 for supplying electrical power with an end section located in the concave portion 1, and lead-free solder 17. The lead free solder 17 is composed mainly of Sn, and further contains, at least, between 5% and 40% inclusive of Sb and between 0% and 10% inclusive of Cu by mass, and has a solidus temperature of at least 235° C.

8 Claims, 4 Drawing Sheets

FIG.4

|  |  | COMPOSTION (MASS %) | | | | | MELTING POINT (DEGREES CENTIGRADE) | | TEMPERATURE CYCLE TEST |
|---|---|---|---|---|---|---|---|---|---|
|  |  | Sn | Sb | Cu | Ag | Bi | OTHER | SOLIDUS | LIQUIDUS | DECISION ABOUT CRACKS AFTER 250 CYCLES |
| EXAMPLES OF THE INVENTION | 1 | Bal. | 5 | | | | | 240 | 243 | SATISFACTORY |
| | 2 | Bal. | 10 | | | | | 245 | 266 | SATISFACTORY |
| | 3 | Bal. | 15 | | | | | 246 | 301 | SATISFACTORY |
| | 4 | Bal. | 20 | | | | | 245 | 324 | SATISFACTORY |
| | 5 | Bal. | 30 | | | | | 244 | 365 | SATISFACTORY |
| | 6 | Bal. | 40 | | | | | 243 | 398 | SATISFACTORY |
| | 7 | Bal. | 10 | 10 | | | | 238 | 329 | SATISFACTORY |
| | 8 | Bal. | 15 | 1 | | | | 239 | 305 | SATISFACTORY |
| | 9 | Bal. | 15 | 9 | | | | 239 | 380 | SATISFACTORY |
| | 10 | Bal. | 20 | 3 | | | | 239 | 313 | SATISFACTORY |
| | 11 | Bal. | 20 | 5 | | | | 239 | 353 | SATISFACTORY |
| | 12 | Bal. | 25 | 5 | | | | 239 | 352 | SATISFACTORY |
| | 13 | Bal. | 30 | 3 | | | | 238 | 353 | SATISFACTORY |
| | 14 | Bal. | 30 | 5 | | | | 240 | 354 | SATISFACTORY |
| | 15 | Bal. | 30 | 10 | | | | 239 | 428 | SATISFACTORY |
| | 16 | Bal. | 40 | 1 | | | | 240 | 388 | SATISFACTORY |
| | 17 | Bal. | 40 | 7 | | | | 314 | 380 | SATISFACTORY |
| | 18 | Bal. | 10 | | 1 | | | 240 | 264 | SATISFACTORY |
| | 19 | Bal. | 25 | 3 | 0.3 | | | 235 | 330 | SATISFACTORY |
| | 20 | Bal. | 25 | 5 | 0.3 | 0.5 | | 235 | 349 | SATISFACTORY |
| | 21 | Bal. | 30 | 4 | | | Ni 0.05 Ge 0.01 | 239 | 350 | SATISFACTORY |
| | 22 | Bal. | 30 | 4 | | | Mn 0.05 | 238 | 350 | SATISFACTORY |
| | 23 | Bal. | 30 | 5 | | | Mo 0.05 | 239 | 346 | SATISFACTORY |
| | 24 | Bal. | 25 | 3 | | | Cr 0.01 Fe 0.03 | 239 | 333 | SATISFACTORY |
| | 25 | Bal. | 25 | 6 | | | Co 0.02 P 0.01 | 236 | 365 | SATISFACTORY |
| | 26 | Bal. | 25 | 5 | | | Ga 0.05 | 238 | 351 | SATISFACTORY |
| EXAMPLES FOR COMPARISON | 1 | 100 | | | | | | 232 | 232 | FAILED |
| | 2 | Bal. | | 0.7 | | | | 227 | 227 | FAILED |
| | 3 | Bal. | | 1 | | | | 226 | 245 | FAILED |
| | 4 | Bal. | | 2.5 | | | | 226 | 324 | FAILED |
| | 5 | Bal. | | | 3.5 | | | 221 | 221 | FAILED |

LAMP

TECHNICAL FIELD

The present invention relates to halogen lamps, HID lamps and the like.

BACKGROUND ART

Lamps such as metal halide lamps commonly include a glass bulb (external bulb) with a concave portion formed at one end part, and an E-type base that is fixed to the one end of the glass bulb and has an eyelet part and a shell part.

A arc tube with electrodes disposed therein is provided inside the glass bulb.

Further, two leads for supplying electrical power to the electrodes extend out from the end of the glass bulb that is at the base.

One of the leads extends through a through hole provided in the eyelet part of the base, and is soldered to the outside surface of the eyelet part to form an electrical connection with the eyelet part.

The other lead extends from the concave section of the glass bulb, and passes between the glass bulb and the shell part of the base, being electrically connected to the shell part by solder poured into a gap between the concave portion and the base.

The solder poured into the gap between the concave portion and the base connects to the glass bulb and the base, and further functions to prevent the base from rotating with respect to the glass bulb.

Note here that, during metal halide lamp operation, the temperature of the base reaches 200° C. or more due to the heat generated in the arc tube. Hence, the solder used in the base section must not only be a high temperature solder, but one that does not melt even at temperatures of 200° C. or more.

Note that, in this specification, a solder whose solidus temperature is 183° C., the melting point of Pb-63Sn, or more is referred to as a high temperature solder.

Conventionally, solders such as Pb-20Sn and Pb-10Sn, which are described in JIS Z 3281 (1999), have been widely used as high temperature solders in the base section of lamps. Such high temperature solders, whose main constituent is Pb, have good solderability with respect to bases made from brass, nickel plated brass and the like.

Note that the "good solderability" referred to here means, in terms of the manufacturing process, that solder wire can be used, that solder is easily fed into the soldered section, and that the melted solder sets quickly; and in terms of solder quality, that respective alloy layers are formed between the lead material, the solder and the base material, and that the formed electrical connections are stable.

However, in recent years, due to environmental considerations, regulation against the use of high temperature solder with lead as the main constituent has continued globally. For this reason, there is a strong demand for lead-free solder, which does not include Pb.

To realize such a lead-free solder, solders containing Sn as their main constituent, and including other appropriately added elements have been examined.

Specifically, an alloy composed of mainly of Sn, containing between 1% and 2.5% exclusive of Cu by mass, has been proposed as a lead-free solder for use in lamps (see laid open Japanese patent application 2002-245974).

However, when lamps using this type of lead-free solder composed of an Sn—Cu alloy were used, for instance, in low temperature conditions where the temperature of the surroundings reached −40° C., a problem occurred. This problem was cracking in the soldered section, causing poor conduction between the leads and the base.

On consideration of this problem, the following conclusions could be drawn.

Namely, if a lamp is used in low temperature conditions where the ambient temperature is −40° C., when the lamp is not operating, the temperature of the base is the same as the temperature of the surroundings, which is −40° C. However, when operating, the temperature of the base is 200° C. or more. Hence, the temperature difference between the on and off states for the lamp is extremely large.

Moreover, if the lead free solder composed of Sn and Cu approaches or exceeds its solidus temperature, as is it does when the lamp is on, even supposing it does not melt, its bonding strength will be much reduced.

Due to the factors described above, it may be concluded that that, when a lamp is switched from on to off, the base temperature falls quickly from a high temperature of 200° C. or more to a very low temperature, the solder comes under a large stress because of the differing rates of thermal expansion for the solder and the base, and cracking occurs in the in the soldered section.

Further, in lamps using lead-free solder composed of Sn and Cu the problem occurred whereby the leads easily separated from the solder.

This problem is considered to occur because of insufficient heat-resistance in the lead-free solder.

DISCLOSURE OF THE INVENTION

The present invention was conceived in order to solve the stated problems, and has a particular object of providing a lamp using lead-free solder in which cracking does not occur in the soldered section, when the lamp is used in an environment where the temperature difference between the on and off states of the lamp is very large. A further object is to provide a lamp in which the separation of the leads and the lead free solder used in the lamp is prevented by increasing the heat resistance of the lead-free solder.

In order to achieve the objects described above, the present invention is lamp including: a glass bulb; a base attached to one end of the glass bulb; leads for supplying electrical power; and lead-free solder electrically connecting the leads to the base, wherein the lead-free solder is composed mainly of Sn, further contains, at least, between 5% and 40% inclusive of Sb and between 0% and 10% inclusive of Cu by mass, and has a solidus temperature of at least 235° C.

With this construction, separation of the leads from the solder can be prevented because the heat resistance of the solder is higher than that of conventional lead-free solder. Further, cracking does not occur in the soldered section, even when the lamp is used over a long period in cold conditions, where the temperature difference between the on and off states of the lamp is very large.

Consequently a longer lamp lifetime can be achieved.

Further, the present invention is a lamp including: a glass bulb having a concave portion; a base attached to the glass bulb so as to cover at least part of the concave portion; a lead for supplying electrical power having an end section located in the concave portion; and lead-free solder poured into the concave section to electrically connect the base and the lead, wherein the lead-free solder is composed mainly of Sn, further contains, at least, between 5% and 40% inclusive of Sb and between 0% and 10% inclusive of Cu by mass, and has a solidus temperature of at least 235° C.

With this construction, separation of the lead from the solder can be prevented because of the improvement in the heat resistance of the solder. Further, cracking does not occur in the solder, even when the lamp is used over a long period in very cold conditions where the temperature difference between the on and off states of the lamp is very large.

Also, since the tensile strength (Pa) of the lead-free solder is high, even when a torque is applied between the base and the glass bulb, the lead-free solder resists deformation. Thus, the base can be reliably prevented from rotating with respect to the glass bulb.

Further, the lead-free solder may further contain Ni, Co, Fe, Mo, Cr, and Mn with a combined mass content of between 0% and 0.5% inclusive. With this construction, the flow characteristics of the lead-free solder are better, and the solderability of the lead-free solder can therefore be improved.

Further, the lead free solder may further contain Ag and Bi with a combined mass content of between 0% and 1% inclusive. With this construction, the heat resistance of the solder can be further improved.

Further, the lead-free solder may further contain at least one of P, Ge and Ga, and a combined mass content of P, Ge, and Ga be between 0.001% and 0.05% inclusive. With this construction, the oxidation resistance of the solder can be improved, and the increase in contact resistance due to oxidation at the surface of the solder can be suppressed.

BRIEF DESCRIPTION OF THE DRAWINGS

FIG. 4 is a table showing the melting temperature and temperature cycle test results for lead-free solders of varying composition.

BEST MODE FOR CARRYING OUT THE INVENTION

An embodiment of the present invention is described below with reference to the drawings.

Figure 1:
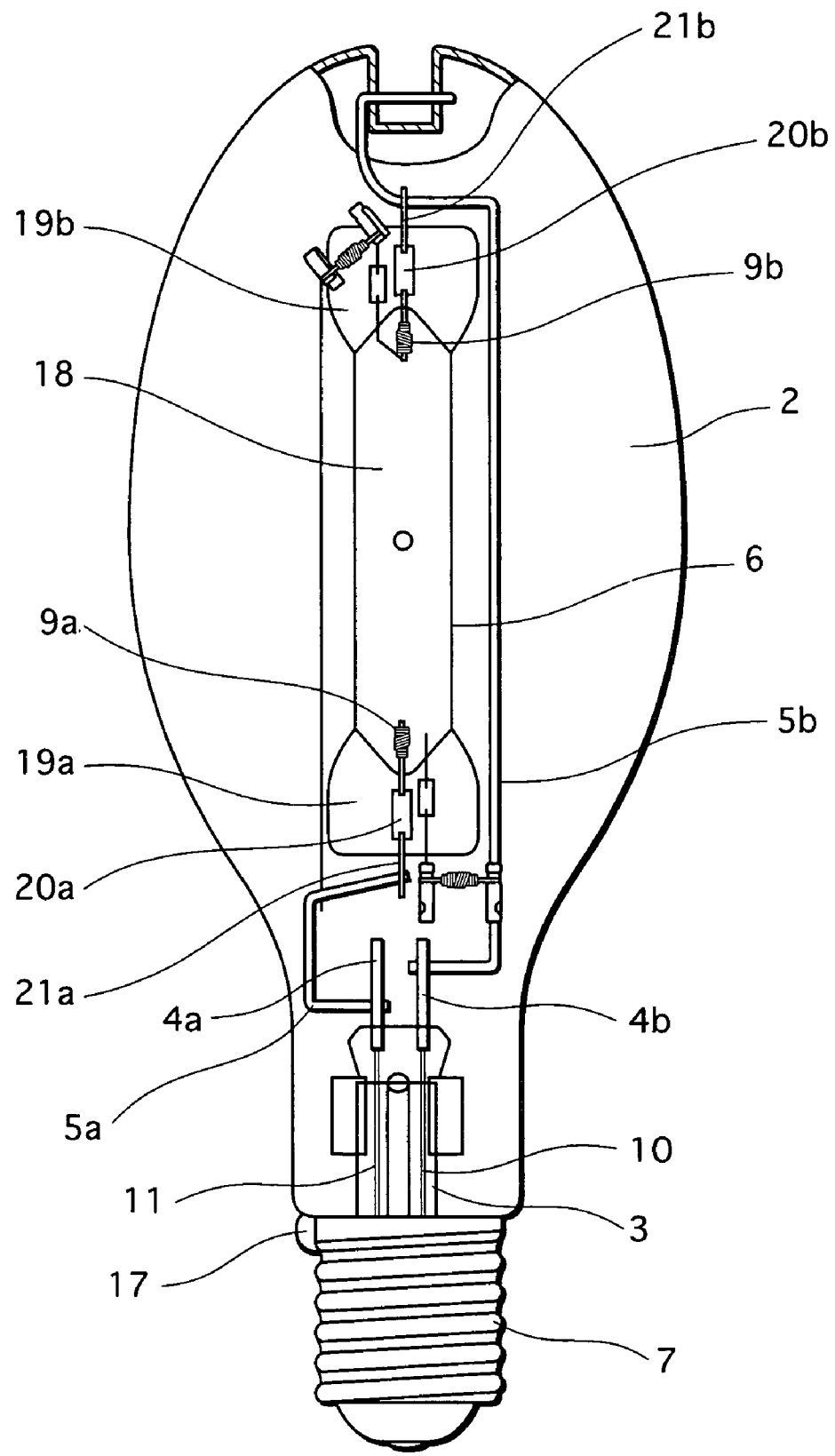
FIG. 1 is a front view with cut-away section of a metal halide lamp that is an embodiment of the present invention.

As shown in FIG. 1, the metal halide lamp of the embodiment of the present invention includes a glass bulb 2 with an internal arc tube 6, and a base 7 attached so as to cover at least part of a concave portion 1 (see FIG. 2) of the glass bulb 2.

The glass bulb 2 may, for example, be made from hard glass or quartz glass.

A stem section 3 is provided inside the glass bulb 2 at the base end of the glass tube, and two stems 4a and 4b are sealed into to the stem section 3. The two stems 4a and 4b sealed into the stem section 3 have end parts that extend from the stem section 3 into the glass bulb 2.

The end parts of the stems 4a and 4b on the stem section 3 side connect to leads 10 and 11, and the end parts that extend inside the glass bulb 2 connect to power supply lines 5a and 5b.

As well as supplying electrical power to electrodes 9a and 9b inside the arc tube 6, the pair of power supply lines 5a and 5b reinforce the arc tube 6.

The arc tube 6 includes an emission section 18 that forms a discharge space within which the pair of electrodes 9a and 9b are disposed so as be opposite one another. Sealing parts 19a and 19b are provided at respective ends of the emission section 18.

Metal iodides, mercury, inert gases and the like are each enclosed in the emission section 18 in predetermined quantities.

The two electrodes 9a and 9b are connected to exterior leads 21a and 21b via molybdenum foil 20a and 20b, which is sealed inside the sealing parts 19a and 19b. The exterior leads 21a and 21b connect to the power supply lines 5a and 5b.

The base 7 is a screw type (E-type) base.

Figure 2:
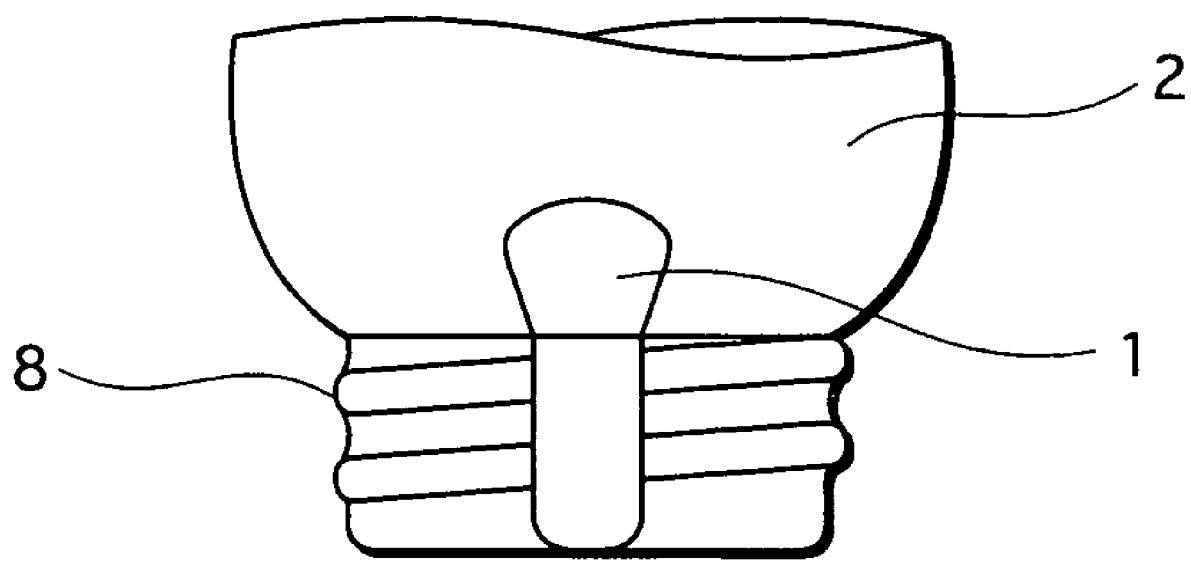
FIG. 2 is an enlarged elevation of part of the metal halide lamp.

As shown in FIG. 2, the concave portion 1 and thread section 8 are provided on the end of the glass bulb to which the base 7 is attached.

Figure 3:
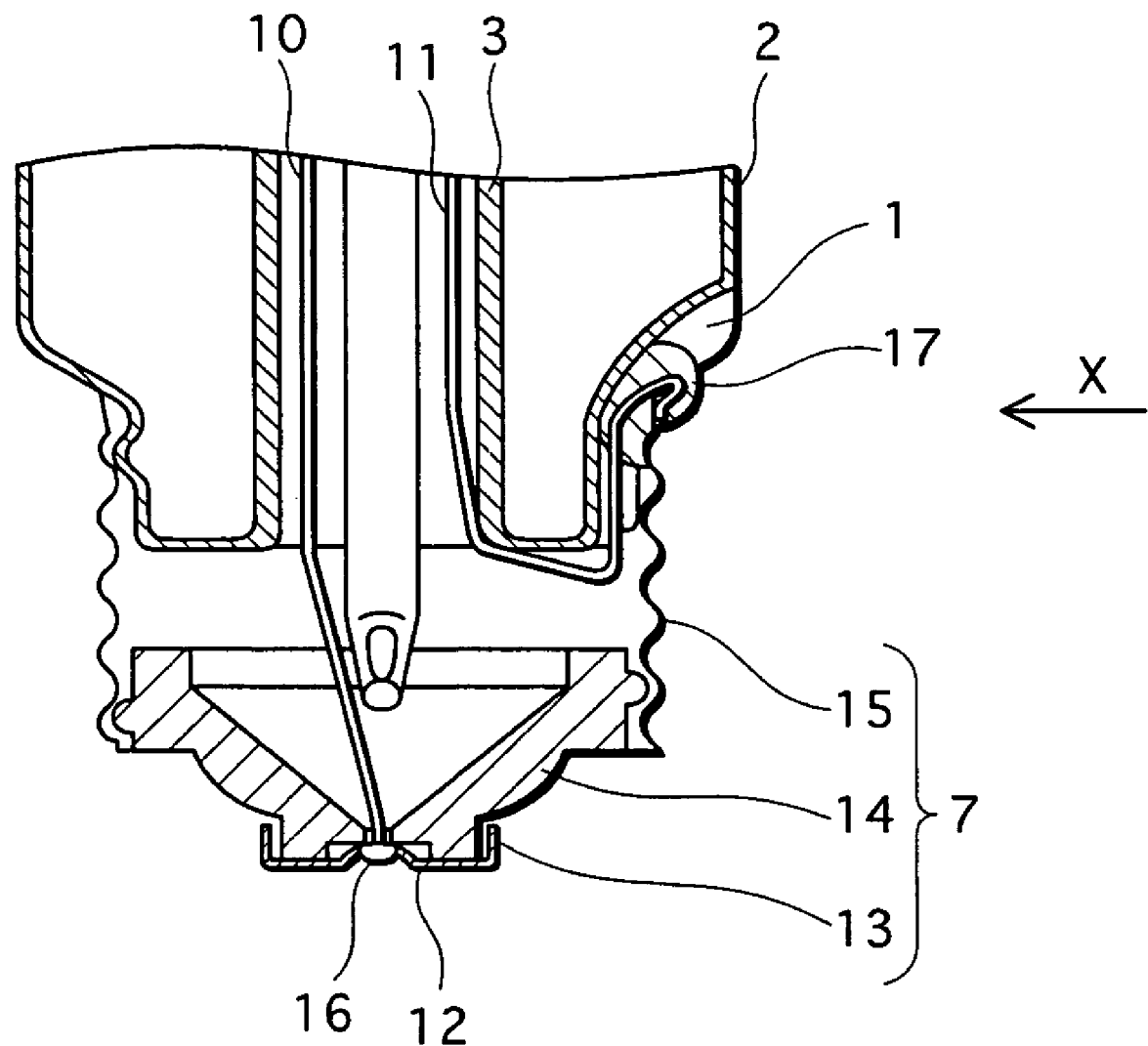
FIG. 3 is an enlarged cross-sectional view of a part of glass bulb used in the metal halide lamp.

As shown in FIG. 3, the base 7 includes the eyelet part 13 with a central through hole 12, and a shell part 15 that is provided via a glass insulator 14 in the eyelet part 13. The eyelet part 13 and the shell part 15 may be made of a material such as nickel-plated brass. Note here that FIG. 2 shows FIG. 3 as seen along direction X.

The shell part 15 of the base 7 and the thread section 8 of the glass bulb 2 are screwed together, and thereby mechanically attached.

One of the leads 10 is passed through a through hole 12 that is provided through the bottom surface of the base 7, and is soldered to the exterior surface of the eyelet part 13 using lead-free solder 16.

Extending out of the other side of the glass bulb 2, the other lead 11 passes between the glass bulb 2 and the shell part 15 where the concave portion 1 is located.

Further, the other lead 11 is electrically connected to the shell part 15 via lead-free solder 17, which is poured into the gap between the concave portion 1 and the base 7.

Here, at the concave portion 1, the lead-free solder 17 is in contact with both the glass bulb 2 and the base 7, and functions to prevent rotation, particularly reverse rotation, of the base 7 with respect to the glass bulb 2.

Note that suitable decisions about details such as the shape and depth of the concave portion 1 are made after considering hereafter described factors such as the quantity of solder to be poured into the gap and the type of pouring method.

The lead-free solder 16 and 17 is composed mainly of Sn, further contains, at least, between 5% and 40% inclusive of Sb and between 0% and 10% inclusive of Cu by mass, and has a solidus temperature of at least 235° C.

Note that, though the term "lead-free" may be intended for a solder with no added lead whatsoever, in this specification the term "lead-free" also covers the case where small quantities of lead have unavoidably become mixed into the solder.

If the Sb content of a solder is less than 5% by mass, the solidus temperature drops below 235° C., and the heat resistance drops. Because of the drop in the heat resistance, such solders are found to be inappropriate for use in the base 7 whose temperature reaches 200° C. or more when the lamp is on. If, on the other hand, the Sb content exceeds 40% by mass, the solder becomes brittle, and is found to detach easily after an externally applied impact to the soldered section. Hence, the Sb mass content has been set between 5% and 40% inclusive.

Further, if the Cu content exceeds 10% by mass, the liquidus temperature reaches at least 450° C., and a soldering temperature of at least 450° C. is necessary. If the soldering temperature exceeds 450° C., however, fracture may occur due to distortions in the glass section of the lamp caused by the heat, and the soldering process may become more difficult.

Here, for the remaining constituents of the lead-free solder 16 and 17, it is preferable that the total content of Ni, Co, Fe, Mo, Cr and Mn together is 0.5% or less by mass, so as to improve the solder flow characteristics and improve the strength of the joints between the base 7 and the leads 10 and 11.

Further, for the remaining constituents of the lead-free solder 16 and 17, it is preferable that the total content of Ag and Bi together is 1% or less by mass, so as to improve the heat resistance.

Moreover, for the remaining constituents of the lead-free solder 16 and 17, it is preferable that the solder contains at least one of P, Ge, and Ga, and that the total content of these constituents together is between 0.001% and 0.05% inclusive by mass.

This is because it was found that, if the total content of these constituents is less than 0.001% by mass, acid resistance of the solder cannot be sufficiently improved, and on the other hand, if the total content exceeds 0.05% by mass, solderability may be reduced.

Experiments were performed to ascertain the operating performance of metal halide lamps of the embodiment of the present invention.

First, the metal halide lamps of the embodiment of the present invention were produced using the lead-free solder 16 and 17 of the various compositions shown in FIG. 4.

Then, in each of the various lamps, the melting temperature of the lead-free solder 16 and 17 was measured, a temperature cycle test performed, and the results shown in FIG. 4 obtained.

Note that the metal halide lamps of the examples for comparison 1 to 5 only differ from the metal halide lamps of the embodiment of the present invention in terms of the composition of the solder, and are otherwise identical in construction.

The melting temperature measurements and the temperature cycle tests of FIG. 4 were performed in the following manner.

Melting temperature measurement: solidus and liquidus temperatures were measured using differential thermal analysis following the standards set out in JIS Z 3198 (2003).

Temperature cycle test: the lamps were subjected to a heat cycle during which each lamp was first left for 30 minutes in an environment where the ambient temperature was −40° C. and then left for 30 minutes in an environment where the ambient temperature was 200° C. The number of cycles before for cracking occurred in the soldered section of base 7 was then counted. If cracking had not occurred by the $250^{th}$ cycle the lamp was considered to be durable enough for long term use (for the duration of the rated lifetime, for instance), and the lamp was judged to be "satisfactory". On the other hand, lamps in which cracking occurred before the 250 cycles were completed were judged to have "failed".

As is clear from FIG. 4, it was discovered that, by setting the composition of the lead-free solder 16 and 17 to contain Sn as the main constituent, and further contain, at least, between 5% and 40% inclusive of Sb and 10% or less of Cu by mass, a solidus temperature of at least 235° C. could be achieved, and hence, the heat resistance of the solder could be improved, separation of the lead-free solder 16 and 17 from the leads 10 and 11 could be prevented, and cracking in the soldered section could be prevented over long periods of use. As a result, poor conduction between the leads 10 and 11 and the base 7 could be prevented, and a longer lifetime for the lamp could be achieved.

On the other hand, in the case of the examples for comparison 1 to 5, it was discovered that the solidus temperature was less than 235° C., the heat resistance was insufficient, and cracking occurred in the soldered section.

Next, for each of the examples of the invention 1 to 26 and the examples for comparison 1 to 5, a torque of 10 Nm, the level generated when a lamp is removed from its socket (not shown), was applied to the base 7 to ascertain whether or not the base 7 would rotate with respect to the glass bulb 2.

Note that, in the Japanese Industrial Standard (JIS C7604), the standard base torque endurance in terms of twisting moment for a E26 type base is 2 Nm. However, here, the reference value set to 10 Nm with practical use in mind.

From the result of this test, it was discovered that base 7 did not rotate with respect to the glass bulb 2 in the examples of the invention 1 to 26. This is considered to be because the tensile strength of the lead-free solder 17 in examples 1 to 26 was high, and because the lead-free solder 17 did not deform even when a force acted in the rotation direction on the base 7 with respect to the glass bulb 2.

On the other hand, in the examples for comparison 1 to 5, the base 7 did rotate, if only by a small amount, with respect to the glass bulb 2. This maybe considered to be because the tensile strength of the solder in the examples for comparison was low, and hence, part of the lead free solder did deform when a force acted in the rotation direction on the base 7 with respect to the glass bulb 2.

Hence, by using a lead-free solder 17 composed mainly of Sn, further containing, at least, between 5% and 40% inclusive of Sb and 10% or less of Cu by mass, with a solidus temperature of at least 235° C. to connect the lead 11 and the shell part 15, rotation of the base 7 with respect to the glass bulb 2, in particular, can be reliably prevented.

Note that, as examples of the tensile strength of the solder, in examples of the present invention 1, 2, 13, and examples for comparison 1, 2 and 5, the tensile strength of the of the solder was 30 MPa, 58 MPa, 90 MPa, 28 MPa, 32 MPa and 41 MPa respectively.

Note also that though in the above embodiment the case where the solder used between the lead 10 and the eyelet part 13, and the solder used between the lead 11 and the shell part 15 are both the same lead-free solder 16 and 17 has been described, the composition of lead-free solder 16 and 17 may be varied.

Further, though described in the above embodiment with a regular halide lamp as an example, the present invention is not limited to such a lamp, and can also be suitably applied, for example, in high pressure sodium and xenon type high pressure discharge lamps, halogen electric light bulbs, incandescent bulbs and the like.

INDUSTRIAL APPLICABILITY

The lamp of the present invention can be used in lamp applications and the like, where it is necessary that separation of the leads from the solder can be prevented, and further, where it is necessary that a poor connection between the base and the leads resulting from cold environment use when there is a large temperature difference between the on and off states can be prevented.

The invention claimed is:
1. A lamp comprising:
a glass bulb;

a base attached to one end of the glass bulb;

leads for supplying electrical power; and lead-free solder electrically connecting the leads to the base, wherein the lead-free solder is composed mainly of Sn, further contains, at least, between 5% and 40% inclusive of Sb and between 0% and 10% inclusive of Cu by mass, and has a solidus temperature of at least 235° C.

2. A lamp comprising:

a glass bulb having a concave portion;

a base attached to the glass bulb so as to cover at least part of the concave portion;

a lead for supplying electrical power having an end section located in the concave portion; and lead-free solder poured into the concave section to electrically connect the base and the lead, wherein the lead-free solder is composed mainly of Sn, further contains, at least, between 5% and 40% inclusive of Sb and between 0% and 10% inclusive of Cu by mass, and has a solidus temperature of at least 235° C.

3. The lamp of claim 1, wherein the lead-free solder further contains Ni, Co, Fe, Mo, Cr, and Mn with a combined mass content of between 0% and 0.5% inclusive.

4. The lamp of claim 1, wherein the lead free solder further contains Ag and Bi with a combined mass content of between 0% and 1% inclusive.

5. The lamp of claim 1, wherein, the lead-free solder further contains at least one of P, Ge and Ga, and a combined mass content of P, Ge, and Ga is between 0.001% and 0.05% inclusive.

6. The lamp of claim 2, wherein the lead-free solder further contains Ni, Co, Fe, Mo, Cr, and Mn with a combined mass content of between 0% and 0.5% inclusive.

7. The lamp of claim 2, wherein the lead free solder further contains Ag and Bi with a combined mass content of between 0% and 1% inclusive.

8. The lamp of claim 2, wherein, the lead-free solder further contains at least one of P, Ge and Ga, and a combined mass content of P, Ge, and Ga is between 0.001% and 0.05% inclusive.

* * * * *